Jan. 31, 1956 J. Z. MENARD 2,733,300

MEANS FOR BULK DEMAGNETIZATION

Filed Oct. 11, 1951 2 Sheets-Sheet 1

INVENTOR
J. Z. MENARD
BY
V. P. Priolo
ATTORNEY

Jan. 31, 1956 J. Z. MENARD 2,733,300

MEANS FOR BULK DEMAGNETIZATION

Filed Oct. 11, 1951 2 Sheets-Sheet 2

INVENTOR
J. Z. MENARD
BY V. P. Triolo
ATTORNEY 2,733,300

MEANS FOR BULK DEMAGNETIZATION

James Z. Menard, Summit, N. J., assignor to Bell Telephone Laboratories, Incorporated, New York, N. Y., a corporation of New York Application October 11, 1951, Serial No. 250,860

8 Claims. (Cl. 179—100.2)

This invention relates to bulk demagnetization and more particularly to a method of and means for bulk demagnetization of a record medium of a type used in a magnetic recording device.

Magnetic recording facilities are provided in the telephone plant for furnishing short repetitive announcements such as are required for weather announcing service and the interception of telephone calls to vacant and unassigned numbers. In these facilities it has been found desirable to dispose the record medium on the surface of a rotating cylinder and cause the record to occupy a helical track on said surface.

Difficulties are encountered in erasing this record with a separate erase head in accordance with conventional wire and tape recorder practice. It is not possible for the erase and record-reproduce heads to trace identical helical paths during the entire operating cycle because there is of necessity a physical displacement between them. It is therefore possible to record and reproduce on a small section of track which cannot be reached with the erase head. While it is conventional commercial practice to erase an old message and simultaneously record a new one, some applications in telephone work require the use of a separate erase cycle. When a conventional single track erase head is used, the erase operation requires as much time as a full recording cycle.

The foregoing difficulties can be overcome by erasing with a magnetic head structure wide enough to cover the entire length of the recorded helix. This allows complete erasure in one revolution of the cylinder.

Two methods of erasing a magnetic record are known to the art. These are the saturation erase, in which the magnetic record is exposed to a unidirectional magnetic field of saturation intensity, and the neutralization erase in which the magnetic record is exposed to an alternating magnetic field which reaches saturation intensity and decreases cyclically to zero over a period of several cycles.

It is well known in the art that a neutralization erase results in a residual background noise which is an order of magnitude lower than is produced by a saturation erase. The neutralization erase is therefore widely used in tape recording and is obtained by energizing the erase head with alternating current of a frequency several times the highest signal frequency passed by the recording equipment. In commercial exemplifications an erase frequency of 20 kilocycles to 350 kilocycles is used, and is obtained from a vacuum tube oscillator. In the presently known neutralization erase system, the use of an erase frequency approaching the upper frequency transmission limit of the system causes a strong signal at erase frequency to be left on the tape. Devices have been revealed which employ alternating current at power frequency (50 to 60 cycles per second) to erase reels of magnetic tape, but these are not applicable to the present problem because they require that the reels be detached from the recorder and taken to the erasing device.

Theoretically it would be possible to extend the presently known method of neutralization erase to erase wide cylinders, by lengthening the erase head and increasing the power delivered to it. Practically, difficulties in constructing the erasing head and in obtaining the required amount of high-frequency power from oscillators of practicable size have prevented the application of bulk neutralization erase to wide recording media and consequently, saturation erase with direct-current excited electromagnets or movable permanent magnets has been employed in such applications despite its higher residual noise level.

It is an object of this invention to provide a method of and means for achieving neutralization erase of a magnetic record medium disposed on the surface of a rotating cylinder during one revolution of said cylinder.

In accordance with the general features of this invention, the bulk demagnetizing or erasing structure comprises a stack of E-shaped laminations of magnetic material carrying on the center leg thereof a coil energized by a low frequency alternating-current power supply. The erase structure is supported on a shaft which is actuated by a rotary solenoid to bring said structure into erase position near the surface of the rotating record medium. Actuation of the solenoid to move the erase structure from its unenergized position to the erase position closes a switch which applies power to the coil of the erase structure. Release of the rotary solenoid allows the erase structure to withdraw from the record medium. At the end of the travel of the erase structure said switch opens and thereby removes power from said coil.

These and other features of the invention will be more clearly understood from the following detailed description and the accompanying drawings in which.

Figure 1:
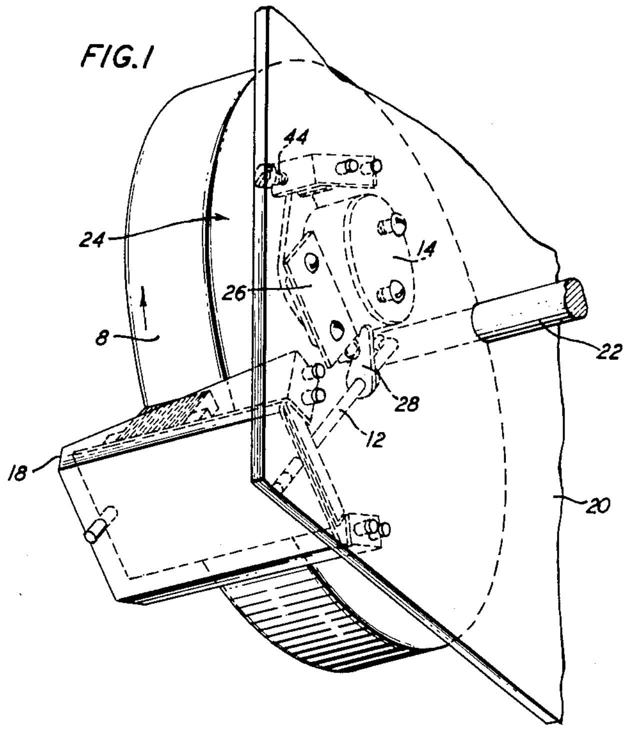
Fig. 1 is a view, in perspective, of a record medium and a bulk erase mechanism therefor according to the invention.

Referring now to the accompanying drawings wherein like reference characters in the different figures designate similar elements, 2 is a preferred embodiment of the lamination stack of the erase structure 4. While it is not essential that this stack be in the form of an E as shown in the different figures, the E, with the coil 6 on the center leg, provides some increase in erasing efficiency since the record medium 8 is subjected to two erase fields as it passes the erase structure.

Figure 2:
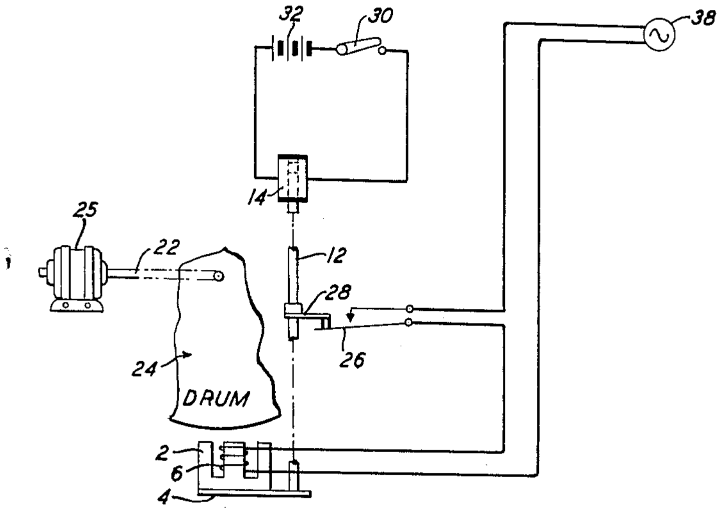
Fig. 2 is a schematic of the electrical control system for actuating the erase structure shown in Fig. 1 and for energizing the coil thereof.
Figure 3:
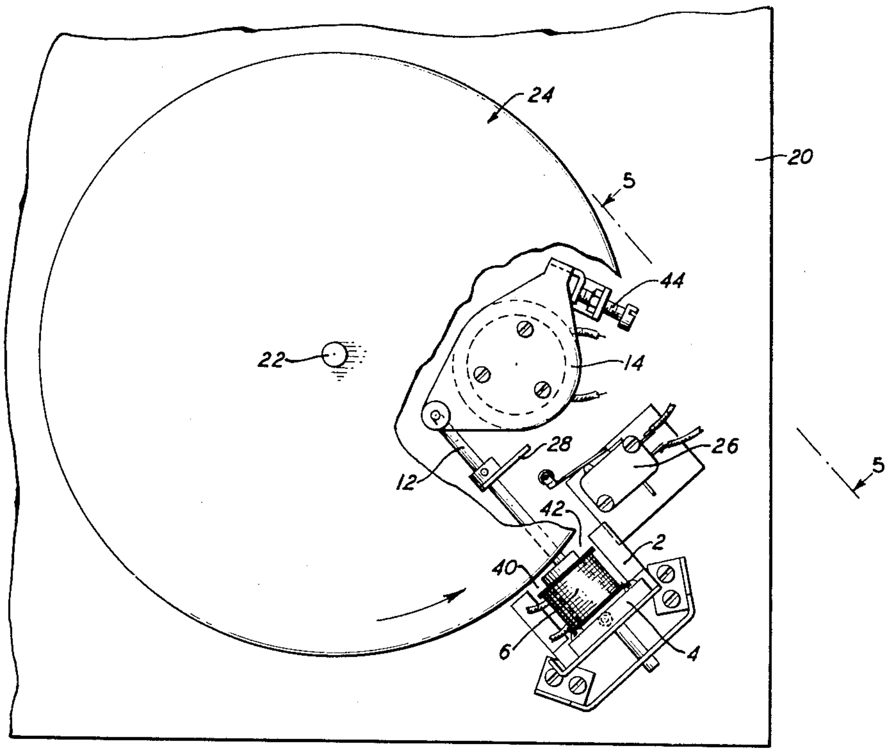
Fig. 3 is a plan view of the mechanism shown in Fig. 1 with the erase structure in erase position near the surface of the record medium.
Figure 4:
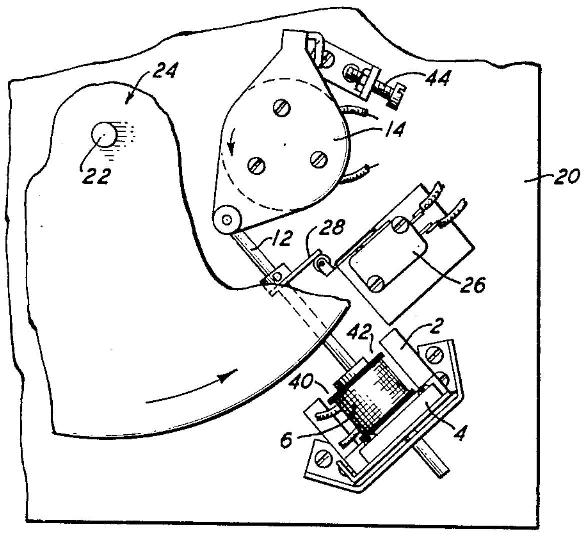
Fig. 4 is a plan view of the mechanism shown in Fig. 1 with the erase structure withdrawn from the erase position and the coil thereof deenergized.
Figure 5:
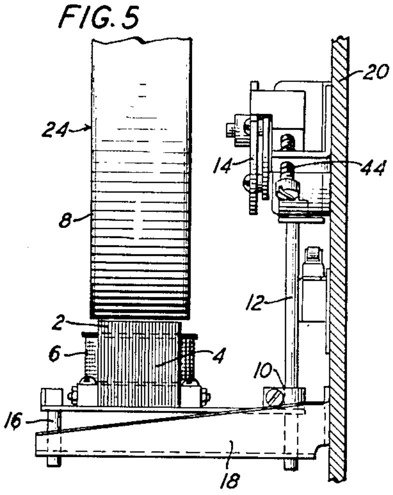
Fig. 5 is a view along line 5—5 of the mechanism shown in Fig. 3.

The erase structure 4 is affixed by means of clamp 10 to the drive shaft 12. The shaft 12 is actuated by the mechanism 14 which in the illustrated embodiment of the invention, as shown in the different figures, is a rotary solenoid. The free ends of shaft 12 and the shaft 16, which is affixed to the structure 4, are supported by the bearing bracket 18. The bracket 18 and the mechanism 14 are affixed to the plate 20 which is at right angles to and supports the drive shaft 22 of the record bearing cylinder 24. The drive shaft 22 and the cylinder 24 may be rotated by means of the motor 25. Also affixed to the plate 20 is the switch 26 which is actuated by the finger 28 on drive shaft 12. As shown in Figs. 2 and 4, the finger 28 holds the switch 26 in open position when the erase structure 4 is unenergized and withdrawn from the record medium 8.

Referring to Fig. 2 it may be seen that the closing of switch 30 will supply energy from battery 32 to the solenoid 14. This will actuate the erase structure 4 toward the record medium 8. Actuation of the erase structure 4 and the drive shaft 12 causes the finger 28 to release the pressure on switch 26. The switch 26 will close and power from the low frequency alternating-current source 38 will be applied to the erase coil 6 through switch 26.

In a preferred embodiment of the erase structure 4, the air-gaps 40 and 42 are substantially ¼-inch wide and extend across the entire width of the record medium. When energized from a 117-volt, 60-cycle source 38, the coil 6 draws approximately 30-volt amperes which is equivalent to approximately 600 ampere turns. With the application of this 60-cycle field to a record medium traveling at a speed of 6 inches per second, satisfactory erasure may be obtained by spacing the gap 40 substantially $\frac{1}{16}$-inch from the surface of the record medium. Under these conditions each element of the rotating record medium is subjected to an alternating-current field which reaches saturation in tensity and then, over a period of several cycles dimnishes progressively to zero. This diminishing field effect, which leaves each element of the record medium in an essentially neutral state, within one revolution of the record bearing cylinder, may be increased to some degree by the structural arrangement shown in the illustrated embodiment of the invention wherein the erase structure 4 is located off-center with respect to the cylinder 24, that is, the axis of the erase structure through the center pole face does not pass through the center of cylinder 24. With this structural arrangement the distance between each element of the rotating record medium and each of the poles of the erase structure 4 is progressively increased.

If the erase structure 4 were not withdrawn from the record medium prior to interrupting the energizing current at the end of the erase cycle, the elements of magnetic material within the field at that instant would be subjected to no further reversals and would consequently behave as if they had been subjected to a direct-current magnetic field of the same intensity as the alternating-current field at the instant it was interrupted. The section of record medium under the influence of the erase structure at the time it was deenergized would exhibit excessive noise in comparison with the remainder of the record medium which was subjected to the normal alternating-current erase. This effect becomes negligible if the separation between the record medium and the erase structure is increased by ½-inch before the coil energizing current is interrupted.

In the present invention the required distance between the record medium and the erase structure in the non-operated or non-energized position may be fixed by means of the clamp 10, and the travel of the erase structure and the drive shaft 12 may be limited by means of the adjustable stop 44. The duration of the erase cycle is related to the length of time the mechanism 14 is energized. This may be controlled manually or by conventional automatic timing means.

It is to be understood that the above-described arrangements are illustrative of the application of the principles of the invention. Other arrangements may be devised by those skilled in the art without departing from the spirit and scope of the invention.

What is claimed is:

1. In magnetic recording system, a rotating cylinder, a magnetic record medium disposed on the surface of said cylinder, support means adjacent said rotating cylinder, a source of low frequency alternating current, demagnetizing means movably mounted on said support means for movement toward and into erase position for the record bearing portion of said cylinder, and for movement away from the record bearing portion of said cylinder, said demagnetizing means comprising a core of magnetizable material including a plurality of poles, a coil wound on one of said poles, said poles having faces positionable in close relation with and extending across the width of the record bearing portion of said cylinder, means for energizing said coil by current from said source of alternating current prior to erasing the record on said record bearing portion and for deenergizing said coil after erasing said record bearing portion, said demagnetization means being withdrawn a predetermined distance from said record bearing portion after said erasure has been completed and before said coil is deenergized.

2. In a bulk demagnetizer, a magnetic record medium disposed on the surface of a cylinder, support means, means for rotating said cylinder comprising a shaft supported by said support means, a source of low frequency alternating current, a core of magnetizable material movably mounted on said support means for movement toward and into erase position for the record bearing portion of said cylinder and for movement away from said cylinder, said core comprising a plurality of poles having faces lying in substantially the same plane and positionable in close relation with and extending across the width of the record bearing portion of said cylinder, a coil wound on one of said poles, means for energizing said coil by current from said source of alternating current prior to erasing the record on said record bearing portion and for deenergizing said coil after erasing said record bearing portion, said core being withdrawn a predetermined distance from said record bearing portion after said erasure has been completed and before said coil is deenergized.

3. In a magnetic recording system, a magnetic record medium disposed on the surface of a rotating cylinder, a source of low frequency alternating current, demagnetizing means comprising a core of magnetizable material including a plurality of poles, a coil wound on one of said poles, support means, a drive shaft affixed to said demagnetizing means and to an actuating mechanism for moving said demagnetizing means a predetermined distance toward and into erase position for the record bearing portion of said cylinder and for moving said means away from the record bearing portion of said rotating cylinder after erasure of the record on said record bearing portion has been completed, said mechanism being mounted on said support means, switch means mounted on said support means, said coil being energized by current from said source of alternating current through said switch means, means on said drive shaft for opening said switch means and deenergizing said coil when said demagnetizing means is withdrawn said predetermined distance from said cylinder, and closing said switch means and energizing said coil when motion toward said cylinder is imparted to said demagnetizing means by said actuating mechanism.

4. In a bulk demagnetizer, a rotating cylinder, a magnetic record medium disposed on the surface of said cylinder, support means, a source of low frequency alternating current, a core of magnetizable material movably mounted on said support means for movement toward and away from said cylinder, said core consisting of two end poles and a center pole having faces lying in substantially the same plane and extending across the width of the record bearing portion of said cylinder, said plane being substantially at right angles to a radius of said cylinder, said radius coinciding with a line parallel to and a predetermined distance from the axis of said core through said center pole face whereby each succeeding pole face in the direction of rotation of said cylinder is disposed further away from the record bearing portion of said cylinder than the pole face preceding it, a coil wound on said center pole, said coil being energized by current from said source of alternating current.

5. In a magnetic recording system, a magnetic record medium disposed on the surface of a cylinder, support means, means for rotating said cylinder comprising a shaft supported by said support means, a source of low frequency alternating current, demagnetizing means comprising a core of magnetizable material consisting of two end poles and a center pole having faces lying in substantially the same plane and extending across the width of the record bearing portion of said rotating cylinder, said plane being substantially at right angles to a radius of said cylinder, said radius coinciding with a line parallel to and a predetermined distance from the axis of said core through said center pole face whereby each succeeding pole face in the direction of rotation of said cylinder is disposed further away from the record bearing portion of said cylinder than the pole face preceding it, a coil wound on said center pole, a drive shaft affixed to said demagnetizing means and to an actuating mechanism for moving said demagnetizing means a predetermined distance toward and into erase position for the record bearing portion of said cylinder and for moving said means away from the record bearing portion of said rotating cylinder after erasure of the record on said record bearing portion has been completed, said mechanism being mounted on said support means, switch means mounted on said support means, said coil being energized by current from said source of alternating current through said switch means, means on said drive shaft for opening said switch means when said demagnetizing means is withdrawn said predetermined distance from said cylinder, and closing said switch means when motion toward said cylinder is imparted to said demagnetizing means by said actuating mechanism.

6. A system in accordance with claim 1 wherein each succeeding pole face in the direction of rotation of the cylinder is disposed further away from the record bearing portion of the cylinder than the pole face preceding it.

7. A demagnetizer in accordance with claim 2 wherein each succeeding pole face in the direction of rotation of the cylinder is disposed further away from the record bearing portion of the cylinder than the pole face preceding it.

8. A system in accordance with claim 3 wherein the poles have faces extending across the width of the record bearing portion of the cylinder and each succeeding pole face in the direction of rotation of the cylinder is disposed further away from the record bearing portion of the cylinder than the pole face preceding it.

References Cited in the file of this patent

UNITED STATES PATENTS 2,481,392 Camras ---------------- Sept. 6, 1949

OTHER REFERENCES

Elements of Magnetic Tape Recording, A. C., Shaney, 1950.